United States Patent [19]

Litovchenko et al.

[11] 4,150,783
[45] Apr. 24, 1979

[54] METHOD FOR READING INFORMATION FROM PUNCHED CARRIER AND DEVICE FOR EFFECTING SAME

[76] Inventors: Sergei S. Litovchenko, ulitsa Oktyabrskaya, 4, kv. 39, Kaluga; Vladimir D. Alyapkin, ulitsa 50 let Oktyabrya, 5, korpus 3, kv. 29, Solntsevo Moskovskoi oblasti, both of U.S.S.R.

[21] Appl. No.: 836,561

[22] Filed: Sep. 26, 1977

[51] Int. Cl.² .......................... G06K 7/14; G08C 9/06
[52] U.S. Cl. ..................... 235/458; 235/467; 235/455; 235/474; 250/555; 250/570
[58] Field of Search ............... 235/454, 455, 458, 474, 235/467; 250/555, 566, 568, 569, 570

[56] References Cited

U.S. PATENT DOCUMENTS

| | | | |
|---|---|---|---|
| 2,448,830 | 9/1948 | Robbins et al. | 235/458 |
| 3,431,426 | 3/1969 | Laidlaw | 235/458 |
| 3,654,478 | 4/1972 | Fuwa | 235/458 |
| 3,692,983 | 9/1972 | Cucciati et al. | 235/458 |

*Primary Examiner*—Daryl W. Cook
*Attorney, Agent, or Firm*—Lackenbach, Lilling & Siegel

[57] ABSTRACT

The method for reading information from a punched carrier, consists of modulating a radiation flux emitted by a radiation source by information holes of the punched carrier and then additionally modulating by an additional modulation means. The double-modulated radiation flux is then reflected by a reflector to a photosensitive input of a main converter which converts the radiation flux into a primary information signal. The primary information signal is then compared to a reference signal which changes according to the law of additional modulation, whereupon the preset signal is discriminated. The proposed device for effecting the method comprises a radiation source optically connected to a reflector through the information holes of the punched carrier, as well as through an additional modulation means. The additional modulation means can perform the functions of the reflector. The device further includes at least one information channel having a main converter whose output is connected via a main amplifier unit to a synchronizing input of a comparator. The comparator comprises a recognition circuit and a preset information signal discrimination circuit placed in series. The photosensitive element of the main converter is optically connected to the reflector. The main converter converts the radiation flux into primary information signals which are sent to the comparator. The comparator compares the primary information signals with a reference signal which is changing according to the law of additional modulation.

56 Claims, 26 Drawing Figures

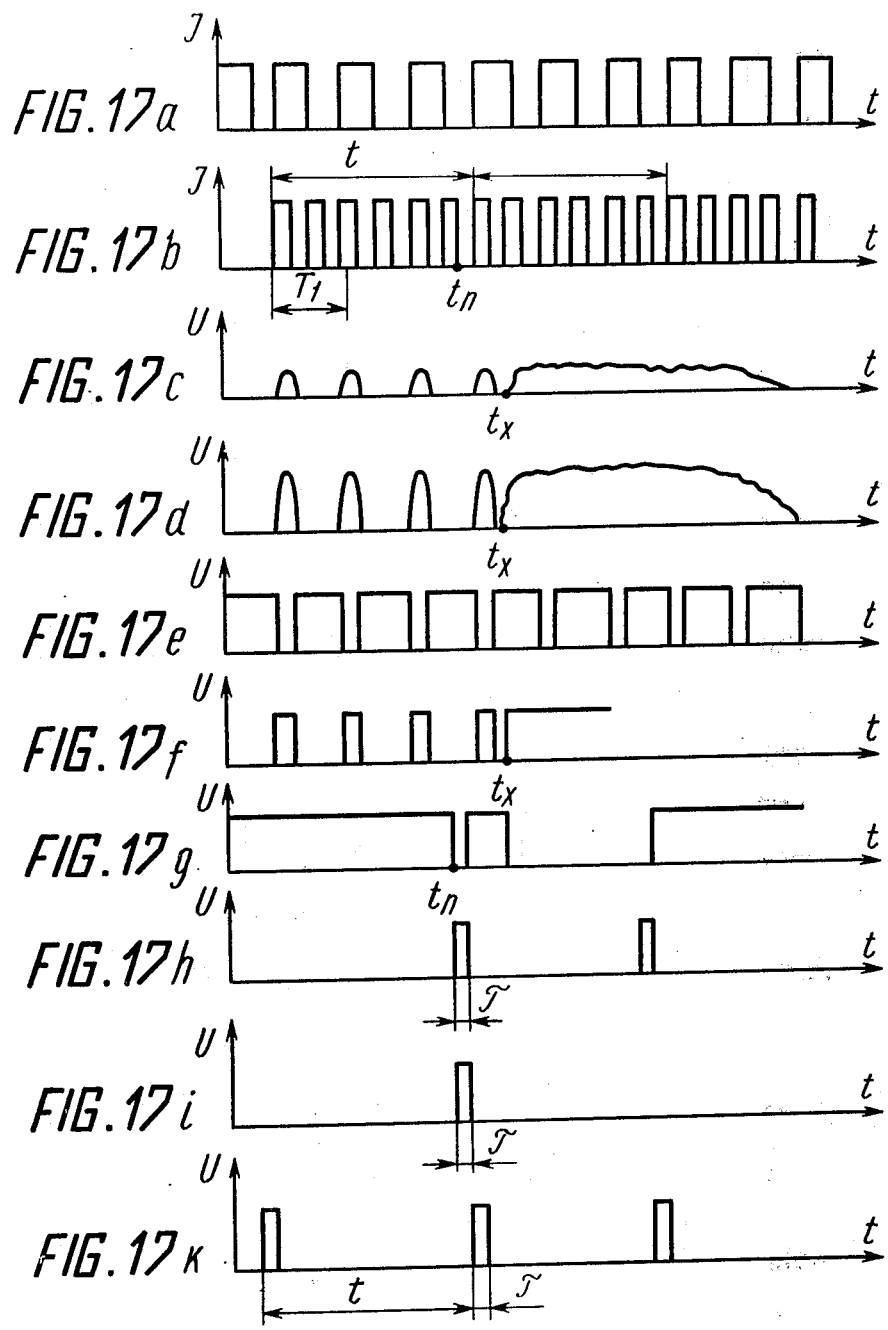

4,150,783

METHOD FOR READING INFORMATION FROM PUNCHED CARRIER AND DEVICE FOR EFFECTING SAME

FIELD OF THE INVENTION

The present invention relates to input-output computer units, information and data retrieval systems, as well as data transmission, automatic and telegraphic equipment. More specifically, the invention relates to a method for reading information from a punched carrier and to a device for effecting this method.

DESCRIPTION OF THE PRIOR ART

There is known a method for reading information from a punched carrier transported across a radiation flux. According to this method, the radiation flux emitted by a radiation source passes through a punched carrier with information holes grouped into information combinations of holes arranged along straight lines extending perpendicular to the longitudinal axis of the punched carrier. The punched carrier may also be provided with synchronization holes belonging to the same information combinations of holes. Upon passing through the punched carrier, the radiation flux is received by a photosensitive element of a converter, which converts it into a primary information signal. The primary information signal is an electric signal which is amplified by an amplifier and applied to a comparator comprising a preset information signal discrimination circuit constructed as a threshold device. According to the method under review, the information readout reliability depends on the signal-to-noise ratio and is determined by the light transmission coefficient of the material of the punched carrier. In the presence of transparent areas on the punched carrier, such as oil stains, the light transmission coefficient of the carrier's material is close to unity. The result is an increased probability of a malfunction of the threshold device, because upon its passage through an oil stain, the radiation flux may be reproduced by the threshold device as a preset information signal produced when the radiation flux passes through an information hole.

The method under review is disadvantageous in that it necessitates a substantial difference between the radiation fluxes passing through the material of the punched carrier and the information holes. To ensure a high resolution of the readout device with regard to the radiation fluxes is a difficult problem which accounts for the low realibility of the device intended to effect the above method.

There is also known a method for reading out information with the use of a reflected radiation flux, which provides for a more reliable readout of information.

According to this method for reading information from a punched carrier, a radiation flux emitted by a radiation source is modulated by information holes of the punched carrier, belonging to an information combination of holes, from which information is being read, i.e. an information combination of holes being interrogated. The radiation flux is then reflected by a reflector; the radiation flux, modulated by the information holes of the information combination of holes being interrogated, is reflected through the same information holes. This is followed by converting the radiation flux into primary information signals and discriminating a preset information signal by comparing the primary information signal with a reference signal produced by means of reflecting, receiving and converting into electric signals the synchronizing radiation flux which is part of the above-mentioned radiation flux that has passed through a synchronization hole of the punched carrier, belonging to the same information combination of holes being interrogated.

The device for carrying out the foregoing method for reading information from a punched carrier comprises a radiation source which emits a radiation flux to be modulated by information holes and a synchronization hole of an information combination of holes being interrogated of the punched carrier. The device further includes a reflector optically connected to information channels whose number is equal to maximum possible number of information holes in the information combination. An information channel comprises a main converter with a photosensitive element at its input; a main amplifier unit for amplifying primary information signals produced at the output of the main converter; and a comparator, for comparing the primary information signal with a reference signal, including a preset information signal discrimination circuit.

The synchronizing radiation source is converted into reference signals by an additional converter arranged over the synchronization hole; the reference signals are amplified by an additional amplifier and applied to the synchronizing input of the comparator of each information channel. The device under review also includes a drive mechanism for transporting the punched carrier between the reflector and radiation source.

The foregoing device operates as follows. The radiation flux emitted by the radiation source passes through the information holes of the information combination of holes being interrogated (this flux will be referred to below as the "information radiation flux"). The information radiation flux is reflected from the reflector, passes again through the same information holes and is received by the photosensitive elements of the main converters which convert it into primary information signals. These are then amplified by the main amplifier unit, the output of each of these units being connected to the respective information input of the respective comparator.

The part of the radiation flux that has passed through the synchronization hole of the information combination of holes being interrogated, i.e. the synchronizing flux, is applied to the input of the additional converter and then to the additional amplifier unit which converts it into a reference signal applied to the synchronizing input of the comparator of each information channel. The comparator compares the primary information signal with the reference signal and discriminates the preset information signal in the case of a coincidence of the parameters of the reference signal and the primary information signal. In the case under review, the comparator compares the amplitudes of the signals, which is due to the reflected luminance modulation of the radiation flux by the punched carrier. The other part of the radiation flux (referred to below as the "side radiation flux"), which is incident on the punched carrier, is absorbed by the punched carrier's material or reflected from the surface of the punched carrier so that it is received by the respective information channel. If the material of the punched carrier is structurally non-uniform, or if there are oil stains on the surface of the punched carrier, the side radiation flux passes through the material of the punched carrier, is reflected by the reflector, passes again through the material of the punched carrier, and is received by the information channel. The result may be the appearance of a spurious signal at the output of the comparator.

In order to guarantee high readout reliability with the use of the method under review, it is necessary to ensure a substantial difference between the information radiation flux and the reflected side radiation flux, i.e. a difference between the reflection coefficients of the reflector and the material of the punched carrier.

It is also necessary that the parameters of the side radiation flux should differ considerably from those of the information radiation flux. However, it is practically impossible to solve this problem if there are, for example, oil stains on the surface of the punched carrier.

According to the method under review, the problem is solved by providing punched carriers with a sufficiently uniform structure of the material and an ideal surface, as well as with a highly accurate location of the information holes.

The device for effecting the method in question does not guarantee an accurate readout of information, because of to the low resolution of the device. Besides, the device is practically rendered inoperative under the action of even a low directional luminous flux.

It is also necessary that the main converters should be accurately located above the information holes of the punched carrier along the path of the information flux reflected by the reflector.

Fluctuations in the luminance of the radiation source and unavoidable differences in the optical properties of the material of the punched carrier, in particular, in the reflection coefficient, which are due to the non-uniformity of the material's structure, make it impossible to raise the reliability of readout to a satisfactory degree.

In most cases, the method under review does not make it possible to use the same device for reading information from punched carriers of different tints or colors without appropriately adjusting the comparator.

It should also be borne in mind that the device for carrying out the known method only provides for parallel, or simultaneous, reading of information from each information combination being interrogated when the radiation flux passes through all the information holes of the information combination being interrogated at the same time, which makes it necessary to use a sophisticated circuitry for receiving, converting and discriminating the preset information signal.

Besides, in the method under review, reliable discrimination of the information signal, which is solely based on the difference in the amplitudes of the information, side and reflected side fluxes, is possible only within a narrow temperature range due to the necessity of using a threshold unit.

SUMMARY OF THE INVENTION

It is, therefore, an object of the present invention to provide a method for reading information from a punched carrier, as well as a device for effecting this method, which would improve the accuracy and reliability of reading information from a punched carrier.

It is another object of the invention to expand the temperature range of the device for carrying out the proposed method for reading information from a punched carrier.

It is still another object of the invention to provide for successive readout of information from each information combination of holes.

It is yet another object of the invention to make it possible to read information from punched carriers of different colors under the conditions of intensified illumination without re-adjusting the comparator.

The foregoing objects of the present invention are attained by providing a method for reading information from a punched carrier, according to which a radiation flux is modulated by information holes of the punched carrier included in an information combination of holes being interrogated. The radiation flux is then reflected by a reflector and converted into primary information signals to be compared with a reference signal so as to discriminate a preset information signal. The radiation flux, modulated by the information holes of the punched carrier, is additionally modulated in accordance with the changes in the reference signal.

It is preferable that the additional modulation of the radiation flux, modulated by the punched carrier, should be performed simultaneously with the reflection process by varying the optical properties of the reflector.

According to the invention, it is desirable that the reflection coefficient of the reflector should be variable.

It is also desirable to vary the wavelength of the radiation flux reflected by the reflector.

It is preferable that the additional modulation should be accompanied by successively passing the radiation flux through each of the information holes of the information combination of holes being interrogated, and converting the radiation flux into primary information signals successively following one another.

It is preferable that the radiation flux, successively modulated by each information hole of the information combination of holes being interrogated, should be optically focused in one point.

According to the proposed method for reading information from a punched carrier, the reference signal can be produced by reflecting and converting a reference radiation flux which is the part of the radiation flux that is not modulated by the information holes of the punched carrier. The additional modulation of the radiation flux and the reference flux should be carried out according to the same law.

According to the invention, it is highly desirable that the reference signal should be produced by reflecting and converting a synchronizing radiation flux which is the part of the radiation flux modulated by the synchronization holes of the punched carrier. The additional modulation of the radiation flux and the synchronizing flux should be carried out according to the same law.

The foregoing objects of the present invention are further attained by providing a device for effecting the proposed method of reading information from a punched carrier, which compries a radiation source optically connected, through the information holes of the information combination being interrogated of the punched carrier, to a reflector; a drive mechanism for transporting the punched carrier mechanically coupled to the punched carrier; and at least one information channel. Each information channel includes a main converter with a photosensitive element at its input, which is optically connected to the reflector, which converts the radiation flux into primary information signals; and a main amplifier unit which connects the output of the main converter to the information input of a comparator. The comparator is intended for comparing the primary information signal with a reference signal and comprises a preset information signal discrimination circuit. In immediate proximity to the punched carrier there is arranged, according to the invention, a means for additional modulation of the radiation flux modulated by the information holes of the information combination of holes being interrogated, which is optically connected to the reflector and the main converter further, the comparator includes a preset information signal recognition circuit connected to the preset information signal discrimination circuit.

It is preferable that the proposed device should be provided with an additional converter optically connected to the reflector through the additional modulation means. This additional converter is intended to convert into a reference signal that part of the radiation flux which is reflected by the reflector and modulated by the additional modulation means alone, the output of the additional converter being connected to the synchronizing input of the comparator of each information channel.

It is desirable that the proposed device should include a second additional converter optically connected to the reflector through the synchronizing hole of the information combination of holes being interrogated and through the additional modulation means. This second additional converter is intended to convert into a reference signal the part of the radiation flux which is reflected by the reflector, modulated by the additional modulation means and the synchronizing holes of the punched carrier, the output of the second additional converter being connected to the synchronizing input of the comparator of each information channel.

It is preferable that the additional modulation means should be a reflector with optical properties variable with time.

It is further preferable that the reflector should have a variable reflection coefficient.

It is preferable that the reflector should be capable of exhibiting a change in its coloration.

It is preferable that the reflector should be a regular right-angled prism rotatable around a rotation axis extending through the base of the prism, the side faces of the prism having different optical properties. It is also preferable that the reflector should be shaped as a cylinder rotatable around a rotation axis extending through the base of the cylinder, the side surface of the cylinder being composed of strips having different optical properties and extending parallel to the rotation. The length of the projection of the side surface of the cylinder or the prism on the plane of the punched carrier should be greater than or equal to the width "b" of the punched carrier. The projection of the rotation axis on the punched carrier should be arranged at an angle $$0 \leq \alpha < \operatorname{arcctg} b/h \qquad (1)$$

to the straight line passing through the centers of the information holes of the information combination of holes being interrogated, where "h" is the distance between two adjacent information combinations of holes.

It is desirable that the additional modulation means should include an inductance coil arranged in immediate proximity to the punched carrier; a current pulse source with terminals connected to the inductance coil; a plate of a magnetoceramic material having one of its ends rigidly secured inside the inductance coil. The plate's opposite end extends parallel to the plane of the punched carrier and is a reflector composed of strips with different optical properties.

It is desirable that the additional modulation means should include a voltage pulse source and a plate of a piezoelectric material, one of whose ends is rigidly mounted on the base of a drive mechanism for transporting the punched carrier and supports a pair of electrodes connected to the terminals of the pulse voltage source. The opposite end of the plate extends parallel to the plane of the punched carrier and is a reflector composed of strips having different optical properties.

It is preferable that the additional modulation means should be constructed as a disc with a rotation axis intersecting the plane of the punched carrier, the disc being arranged between the punched carrier and the reflector along the path of the information radiation flux and being optically connected to said punched carrier and said reflector. The sectors of the disc have different transmission coefficients with regard to the radiation flux. The projection of the disc's diameter on the plane of the punched carrier is equal to or greater than the width "b" of the punched carrier.

It is preferable that the proposed device having one information channel should include a converging optical element interposed between the main converter and the punched carrier along the path of the radiation flux reflected by the reflector and focusing into a common point the radiation flux successively modulated by each information hole of the information combination of holes being interrogated, the photosensitive element of the main converter being located at said common point.

It is desirable that the device should be provided with a reference signal source whose output is connected to the synchronizing input of the comparator of each information channel.

It is preferable that the device should be provided with a gating unit and a reset unit, and that the reference signal source should include an inverter and a clock pulse generator connected in series and intended to synchronize the additional modulation means. The reset unit and the gating unit, the preset information signal recognition circuit comprises, in series, a switching circuit, a first coincidence circuit and a flip-flop, the output of the reset unit being connected to the reset input of the flip-flop, the output of the gating unit being connected to the gating input of the flip-flop and the gating input of a second coincidence circuit performing the function of the preset information signal discrimination circuit.

It is desirable that the preset information signal recognition circuit should include an information tank to accumulate information on the reference signal, said reference signal information tank being connected to a coincidence circuit and being constructed as an electric filter with a resonance frequency equal to the pulse repetition frequency of the primary information signal. The preset information signal discrimination circuit comprises a detector and an integrator placed in series, the comparator having an interlocking input connected to the output of an interlocking unit interacting with the punched carrier.

The proposed method and device for reading information from a punched carrier substantially improve the readout reliability, reduce the probability of an appearance of a spurious signal at the output of the comparator, permit successively reading information from each information combination of holes, and make it possible to operate with punched carriers of different colors and structures of the material.

BRIEF DESCRIPTION OF THE DRAWINGS

Other objects and advantages of the present invention will be more readily understood from the following detailed description of preferred embodiments thereof to be read in conjunction with the accompanying drawings, wherein:

FIGS. 17a–17k are graphs showing is a time plot of voltages at certain points of the device of FIG. 16.

DETAILED DESCRIPTION OF THE INVENTION

Figure 1:
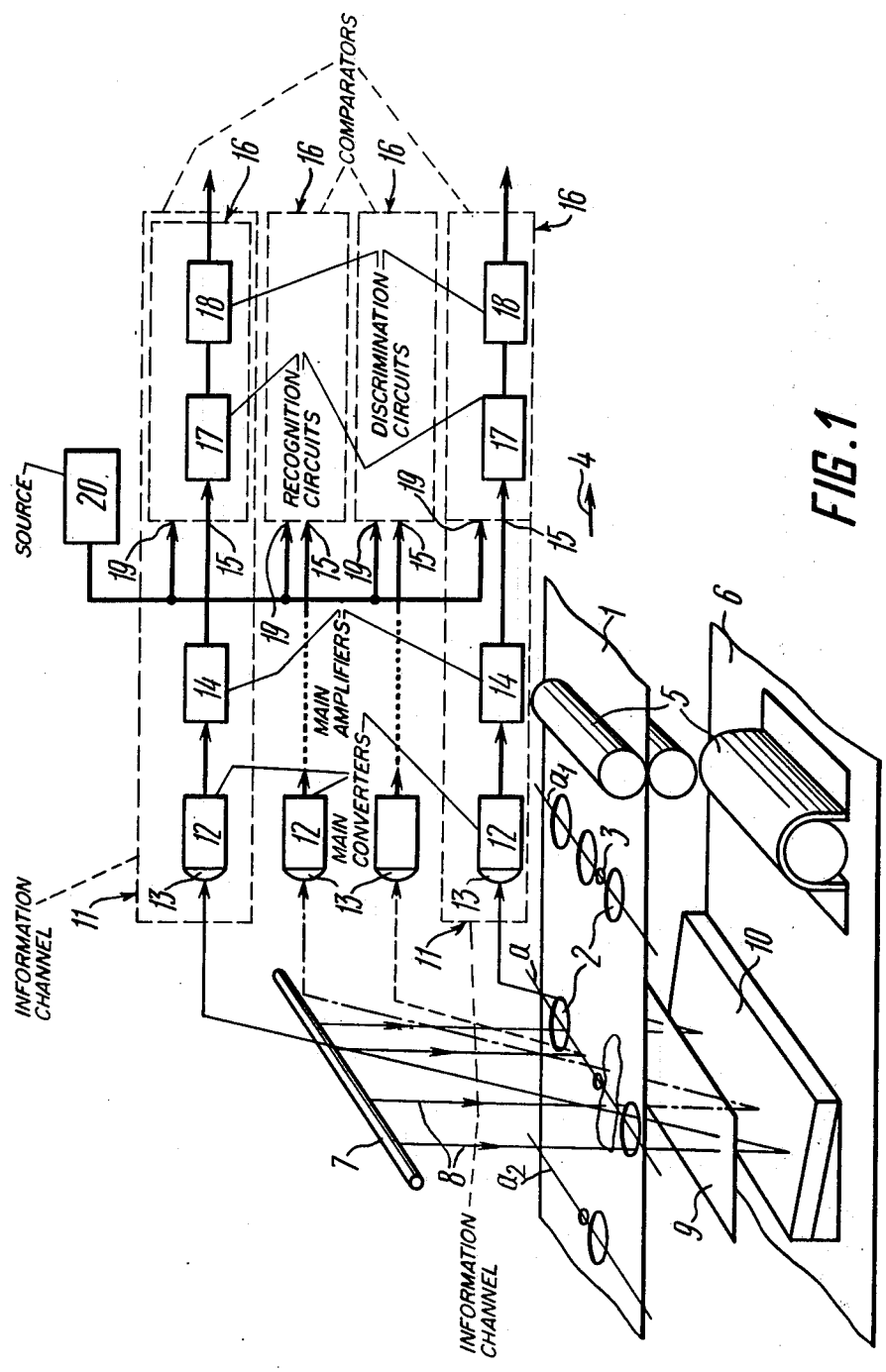
FIG. 1 is a schematic diagram of a device for reading information from a punched carrier, in accordance with the invention.

FIG. 1 is a schematic diagram of a device for carrying out the proposed method of reading information from a punched carrier 1 which is a paper tape with information holes 2 and synchronizing holes 3. The holes 2 and 3 are grouped into information combinations of holes arranged along lines "a", $a_1$ and $a_2$ drawn through the centers of the information holes and extending transversely to the direction of movement of the punched carrier 1, indicated by an arrow 4. The information holes 2 belonging to one of the information combinations a, $a_1$, $a_2$, ... differ in number and arrangement, being coded information. The proposed device further includes a drive mechanism 5 for transporting the punched carrier 1. The mechanism 5 is mounted on a base 6 and ensures uniform advancing motion of the punched carrier 1. The device still further includes a radiation source 7 optically connected by radiation flux 8 through the information holes 2 and an additional modulation means 9 to a reflector 10. For greater clarity, the drawing only shows the radiation flux passing through the first and last information holes 2. The information combination of holes arranged along the line "a" includes the information holes 2, from which information is read during a given period of time; such a combination is referred to as an information combination being interrogated; the period of time, during which information is read from a given combination, is referred to as the interrogation time t. The radiation flux 8, reflected by the reflector 10, optically connects the reflector 10 through the same additional modulation means 9 and the same information holes 2 of the information combination of holes being interrogated to information channels 11. Each information channel 11 comprises a main converter 12, at whose input there is placed a photosensitive element 13. The photosensitive element 13 and the main converter 12 convert the radiation flux 8, reflected by the reflector 10, into a primary information signal. The output of the main converter 12 is connected via an amplifier unit 14 to an information input 15 of a comparator 16 of a respective information channel 11. A preset information signal is produced at the output of each comparator 16. The comparator 16 comprises a preset information signal recognition circuit 17 which is connected in series to a preset information signal discrimination circuit 18. A synchronizing input 19 of each comparator 16 is connected to the output of a reference signal source 20. The number of information channels 11 of the device of FIG. 1 is equal to a maximum possible number of information holes 2 in any information combination of holes. The proposed device for reading information from a punched carrier operates as follows.

The radiation flux 8, emitted by the radiation source 7, passes through the information holes 2 of the information combination being interrogated. The part of the radiation flux 8, which is directly incident on the punched carrier 1, is partially absorbed by the material of the carrier 1 and partially reflected, being converted into a reflected side flux shown by the dash line in FIG. 1. Thus the information holes 2 of the punched carrier 1 modulate the radiation flux 8. The radiation flux 8 is then additionally modulated by the additional modulation means 9. The additional modulation consists in additionally changing the parameters of the radiation flux 8. The radiation flux 8 is then reflected by the reflector 10, whereupon it passes through the additional modulation means 9 and the same information holes 2 and is received by the photosensitive elements 13 placed at the inputs of the main converters 12. The radiation flux 8, which is reflected by the reflector 10, additionally modulated by the additional modulation means 9 and received by the photosensitive element 13, is converted by the main converter 12 into primary information signals. A primary information signal is not invariably the preset information signal which is absolutely indicative of the presence of information, because the main converter 12 also receives side radiation fluxes reflected from the material of the carrier, or side fluxes partially penetrating through transparent areas of the punched carrier 1 (these are shown by the dot-and-dash line in FIG. 1). The primary information signals are then amplified by the amplifier units 14 and applied to the information inputs 15 of the comparator 16. To the sycnhronizing inputs 19 of the comparator 16 there is applied a reference signal sent by the reference signal source 20. The parameters of the reference signal are varied so as to ensure a high accuracy and reliability of reading information from the punched carrier 1. The additional modulation is carried out by the additional modulation means 9 strictly in accordance with the change in the parameters of the reference signal. If the preset information signal recognition circuit 17 establishes a coincidence of the parameters of the reference signal with those of the primary information signal, at the output of the preset information signal discrimination circuit 18, which is connected to the circuit 17, there is produced a preset information signal. However, this occurs only if the radiation flux comes from the source 7 to the reflector 10 and goes back from the reflector 10 to the main converters 12 through the information holes 2 of the information combination of holes being interrogated, and is additionally modulated by the additional modulation means 9. Stains and impurities on the surface of the punched carrier 1 also modulate the reflected side radiation flux, but the pattern of modulation in this case always differs from the way the parameters of the reference signal are changed; as a result, the comparator 16 does not respond to spurious signals. If there are oil stains on the surface of the punched carrier 1, the side radiation flux, which is reflected by the reflector 10, differs from the radiation flux passing through the information holes 2, because the spectrum of the side flux lacks a number of components, for example, the ultraviolet component, which is interpreted by the comparator 16 as a spurious signal.

Hence, it is unnecessary to arrange the converters 12 exactly above the information holes 2.

Conventional readout devices incorporate special threshold circuits for discriminating preset information signals, which considerably limits the temperature range of such devices. No threshold circuits are necessary in the device of the present invention, which makes it possible to use main converters 12 with highly sensitive elements 13 and to operate within a broad temperature range of from about $-60°$ C. to $+70°$ C.

According to preliminary calculations, the proposed method admits of only one error in reading $10^9 \div 10^{10}$ information combinations of a punched carrier 1.

An analysis of conventional readout devices makes it clear that the requirements imposed on punched carriers 1 are quite stringent. For example, the readout device of the 2000 series manufactured by Ex-Cell Corporation of the United States can only use a punched carrier whose infrared permeability is not more than 57 percent. The 4020 model manufactured by Facid-Addo tolerates deflections in the positioning of information holes of not more than 6 percent and uses scattered light sources to perform the function of the radiation source 7; as a result, this device can only use punched carriers which transmit up to 80 percent of the light flux. The latter device is rendered inoperable in the presence of even a weak directional radiation flux.

The proposed method and device provide for broader tolerances as regards the parameters of the punched carrier 1.

Figure 2:
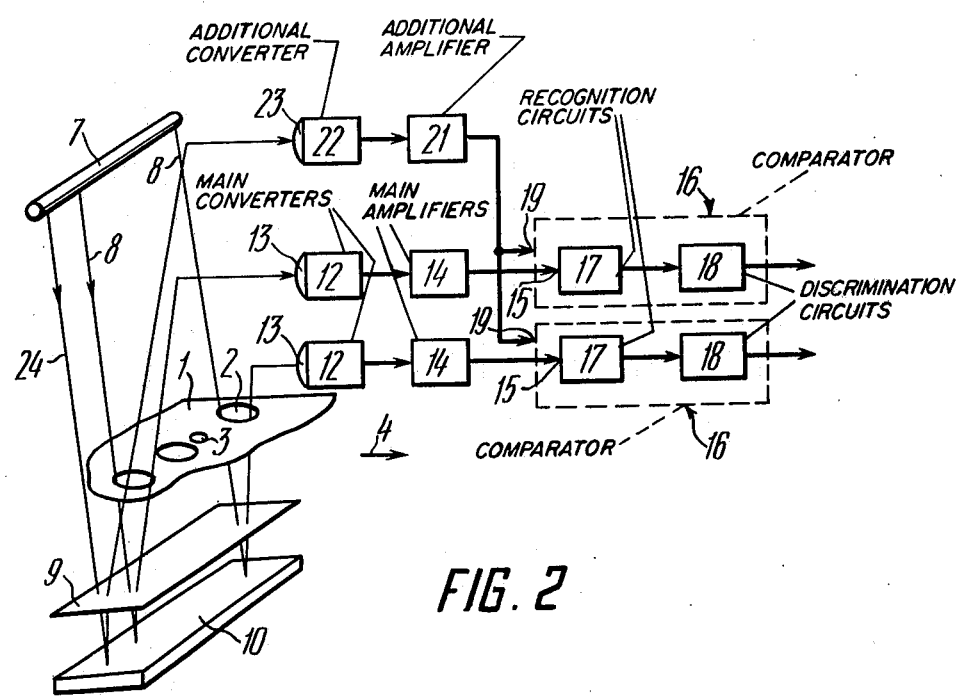
FIG. 2 is a schematic diagram showing an embodiment which makes use of a reference radiation source to produce a reference signal, in accordance with the invention.

FIG. 2 is a schematic diagram of a device for carrying out an alternative method for reading information from a punched carrier, in accordance with the invention. In the device of FIG. 2, the synchronizing input 19 of each of the comparators 16 is connected via an additional amplifier unit 21 to the output of an additional converter 22 at whose input there is placed a photosensitive element 23. The use of the additional converter 22 and the additional amplifier unit 21 makes it possible to produce a reference signal as follows: part of the radiation flux 8 emitted by the radiation source 7 is directed to the reflector 10 through the additional modulation means 9 without modulating it with the information holes 2 of the punched carrier 1. Thus there is produced a reference radiation flux 24 which is part of the radiation flux 8 emitted by the source 7. The reference flux 24, modulated by the additional modulation means 9, is then reflected by the reflector 10, modulated by the means 9, converted by the additional converter 22 and amplified by the additional amplifier unit 21. The resulting reference signal is an electric signal. In this case the characteristics of the additional converter 22 and the additional amplifier unit 21 fully coincide with those of the main converters 12 and the amplifier units 14. The device of FIG. 2 is advantageous in that it dispenses with the reference signal source 20 (FIG. 1); another advantage is that the additional modulation of the primary information signal (FIG. 2) is fully identical with the additional modulation of the reference signal, due to the use of the same additional modulation means 9 and the same reflector 10, as well as due to the equal lengths of travel of the radiation flux 8 and of its part which is the reference radiation flux 24; another reason is that both fluxes 8 and 24 travel through the same medium.

The proposed device is more reliable than the prototype as concerns the readout of information from punched carriers with a soiled surface and all kinds of defects as regards the structure, thickness and color of the material. This is due to the fact that the radiation flux 8 and the reference flux 24 are additionally modulated in a manner which eliminates the possibility of erroneous reproduction of the preset information signal. In fact, the chances that the above-mentioned factors can affect the parameters of the reflected side flux are very small, especially if one takes into consideration that changes in the external factors are relatively slow, whereas the proposed additional modulation is a high-speed process.

Figure 3:
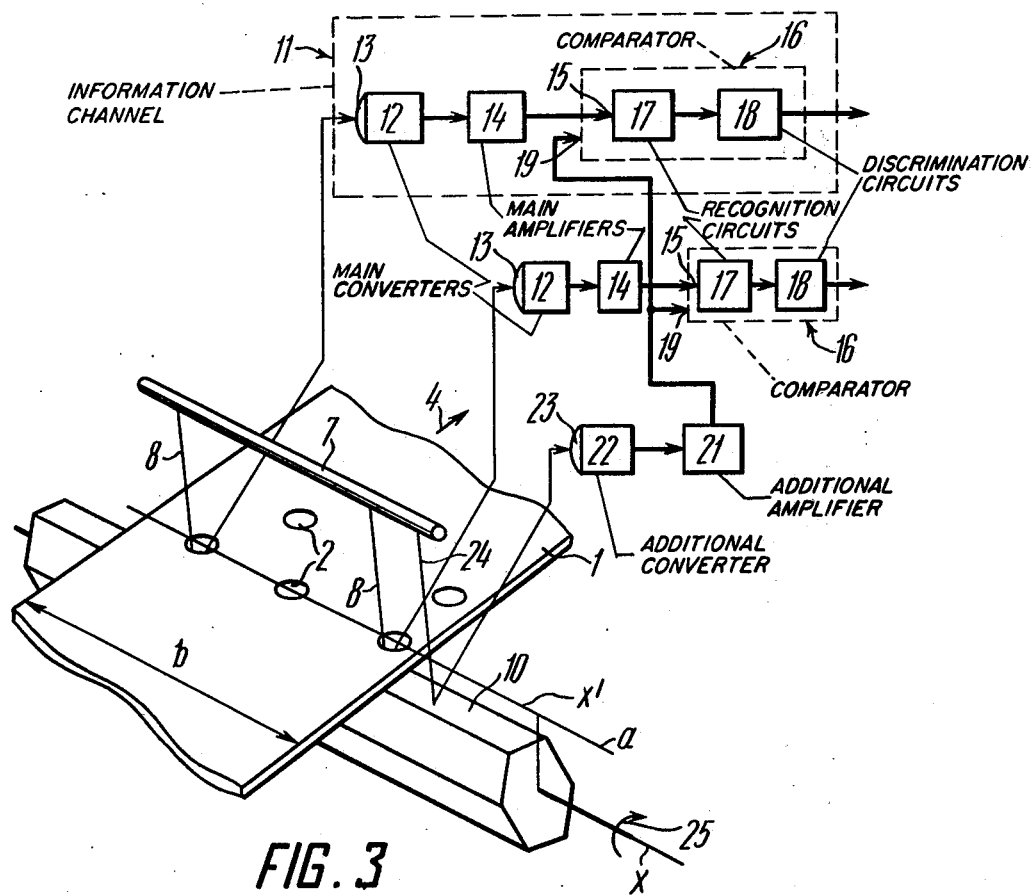
FIG. 3 is a schematic diagram showing an embodiment with a prism reflector performing the function of the additional modulation means, in accordance with the invention.

FIG. 3 is a schematic diagram of a device for carrying out another alternative embodiment of the method in accordance with the invention. In this case, the function of the additional modulation means 9 is performed by the reflector 10 whose optical properties vary with time in accordance with the additional modulation pattern.

As in the foregoing embodiments, in this case additional modulation only covers the radiation flux 8 and that part of it which is the reference flux 24, which considerably improves the accuracy of reading information from the punched carrier 1. The device of FIG. 3 is advantageous over the foregoing embodiments in that the functions of the additional modulation means 9 (FIG. 1) are performed by the reflector 10 (FIG. 3) whose optical properties vary with time. As a result, modulation covers the radiation flux 8 reflected by the reflector 10. The reflector 10 may be constructed as a regular hexahedral prism, in which each side face has a specific reflection coefficient. The width of the side face is about equal to the diameter of an information hole.

The prism is rotatable about a rotation axis "X". The prism must be arranged so that the projection "X'" of the rotation axis "X" on the plane of the punched carrier 1 should be matched with a straight line "a" drawn through the centers of the information holes 2 of the information combination of holes being interrogated; the length of the projection of the prism's side face on the plane of the punched carrier 1 must be equal to or greater than the width "b" of the punched carrier 1.

From the source 7, the radiation flux 8 passes through the information holes 2 of the information combination the of holes being interrogated and is reflected from the side face of the prism, which is parallel to the plane of the punched carrier 1 and has a reflection coefficient of 0.9, for example. As the prism rotates around the "X" axis, each next side face of the prism successively becomes parallel with the plane of the punched carrier 1, which means that it becomes a reflecting face. The reflection coefficients of the side faces are different, so that radiation flux 8, reflected from each side face, is additionally modulated with regard to its luminance; at the outputs of the main converters 12 there are produced amplitude-modulated primary information signals.

The fact that the functions of the additional modulation means 9 (FIG. 3) are performed by the reflector 10 constructed as a polyhedral prism makes it possible to carry out additional modulation of the radiation flux 8 and the reference flux 24 in different ways. For example, by using prism faces of different color, it is possible to additionally modulate the radiation 8 wavelengthwise.

As the punched carrier 1 is set in motion, the information holes 2 pass under the reflecting side faces during a certain interrogation time t; during the same period of time, the radiation flux 8 comes and goes through the same information holes 2 and is received at the inputs of the respective main converters 12. The interrogation time t is determined by the speed of the punched carrier 1.

The prism is rotated at a speed selected so that during the interrogation time t under the information holes 2 of an information combination of holes there passes a certain number n of reflecting side faces having different reflection coefficients; as a result, at the outputs of the main converters 12 there is produced a primary information signal which is a sequence of n pulses. The amplitude of these pulses varies in accordance with the additional modulation pattern. The pulse repetition frequency is equal to the frequency f of rotation of the side faces of the prism. f is derived from the following equation:

$$f = n/t = (k \cdot N)/T \qquad (2),$$

where
- k is the number of prism faces;
- N is the number of complete revolutions made by the prism during the time of interrogation t; and
- T is the rotation period of the prism.

The additional modulation of the radiation flux carried out by the proposed device affects practically all the parameters of the radiation flux 8, including the wavelength, luminance, and pulse repetition frequency. As regards such external factors as a non-uniform structure of the material of the punched carrier 1, or a non-uniform coloring of the carrier 1, or the presence of oil stains on its surface, these factors normally affect only one of the above-mentioned parameters.

According to FIG. 3, the axis "X" of rotation of the prism is parallel to the plane of the punched carrier 1. The axis "X" may also be arranged at an angle to the plane of the punched carrier 1. It is necessary, however, that irrespective of the prism's position, the length of the projection of any side face on the plane of the punched carrier 1 should be greater than or equal to the width "b" of the punched carrier 1. In such a case all the information holes 2 of the information combination of holes being interrogated are found over a reflecting side face of the prism. In the embodiment under review, the projection "X'" of the rotation axis "X" on the plane of the punched carrier 1 is matched with the straight line "a" drawn through the centers of the information holes 2 of the information combination of holes being interrogated; the result is simultaneous reading of information from all the information holes 2 of the information combination of holes being interrogated.

Figure 4:
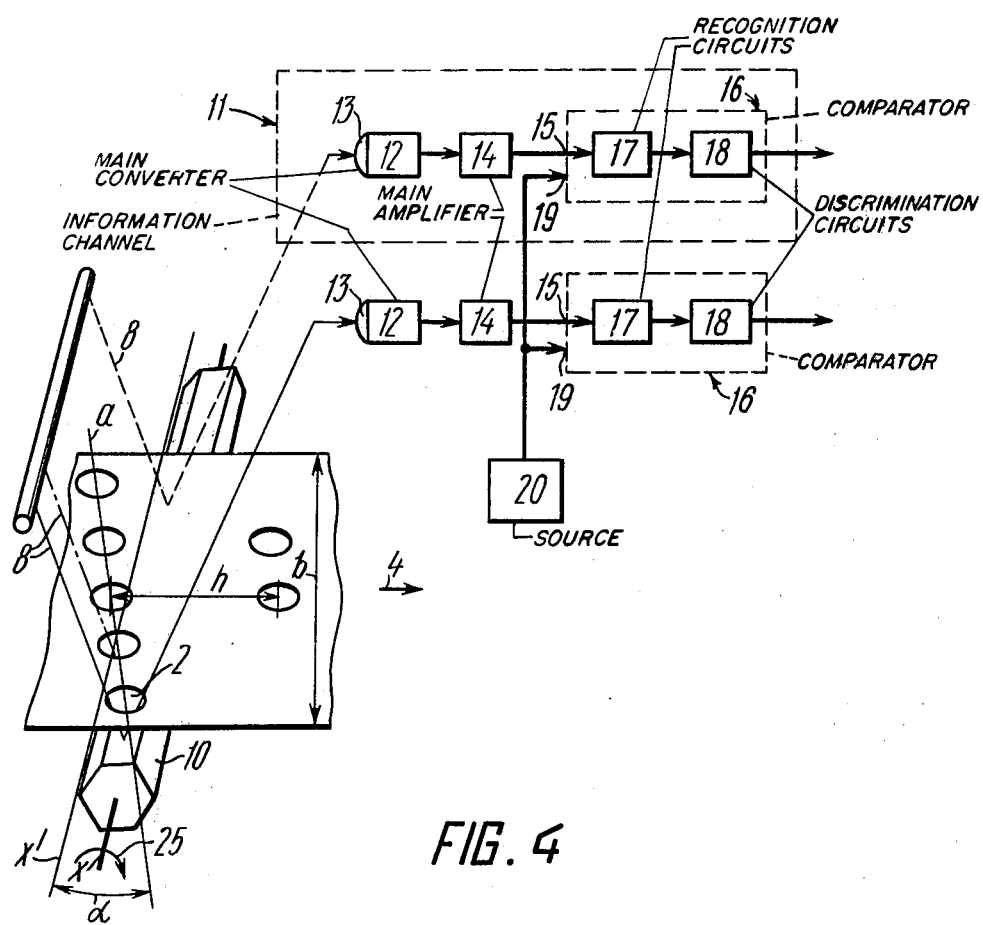
FIG. 4 is a schematic diagram showing a part of a device for successively reading information from a punched carrier, in accordance with the invention.

It is possible to read information successively from each information hole 2 of the information combination of holes being interrogated. For this purpose, the reflector 10, shaped as a prism and carrying out additional modulation of the radiation flux 8, is arranged as shown in FIG. 4. According to FIG. 4, the prism is arranged so that the length of the projection of its side face on the plane of the punched carrier 1 is, as in the above embodiment, equal to or greater than the width "b" of the punched carrier 1. However, in the latter case, the projection "X'" of the axis "X" on the same plane is at an angle $\alpha$ to the straight line "a" passing through the centers of the information holes 2 of the information combination of holes being interrogated. In order to ensure accurate readout of information, it is necessary that the radiation flux 8, that passes through the information holes 2 of the adjacent information combination of holes, should not be incident on the reflecting side face of the prism, which reflects the radiation flux 8 at a given moment of time, which otherwise may lead to the appearance of a spurious signal at the output of the comparator 16 (FIG. 1) from an information hole 2 (FIG. 4) not belonging to the information combination of holes being interrogated.

Hence, the angle $\alpha$ is expected to meet the following condition:

$$0 < \alpha < \operatorname{arcctg} b/h \qquad (3),$$

where h is the distance between two adjacent information combinations of holes.

At a given moment of time, over the reflecting side face of the prism, which is parallel to the plane of the punched carrier 1, there is only one information hole 2 through which the radiation flux 8 passes in both directions until it reaches the respective input of the main converter 12. The radiation flux 8, which passes through the rest of the information holes 2 of the information combination of holes being interrogated, i.e. the "side" flux (shown by the dash-and-dot line in FIG. 4), is reflected from the other side faces of the prism and cannot reach the inputs of the respective main converters 12. During the interrogation time t, under the information hole 2, from which information is being read, there pass n reflecting side faces of the prism, and the radiation flux 8 is luminance-modulated. During the next interrogation period t, the moving punched carrier 1 brings the next information hole 2 of the information combination of holes being interrogated to a position above the reflecting side face of the prism. The reflected side flux (see the dotted line of FIG. 4), which is part of the radiation flux 8 reflected from the surface of the punched carrier 1, reaches the input of the respective main converter 12 arranged across the path of the reflected side flux; however, the modulation of this reflected side flux differs from the additional modulation performed by the reflector 10; as a result, the preset information signal appears at the output of only one comparator 16.

Thus the radiation flux 8 passes through each information hole 2 of the information combination of holes being interrogated, is reflected by the reflector 10, and successively received at the inputs of the respective main converters 12; as a result, the preset information signal appears at the outputs of the respective information channels 11.

Figure 5:
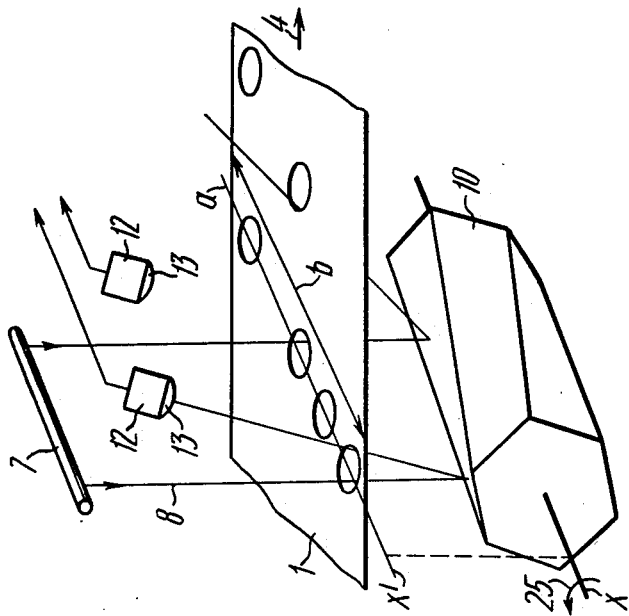
FIG. 5 is a perspective view showing a part of a device with a reflector shaped as a "twisted" prism, in accordance with the invention.

Successive readout of information from the punched carrier 1 is also possible if the reflector 10 (FIG. 5) is constructed as a "twisted" prism. A "twisted" prism is produced by turning one of the bases of a regular straight-angle prism relative to the other base around the axis of symmetry of the prism. Each side face of a "twisted" prism is bent instead of being flat. The prism rotates in the direction of an arrow 25 about the rotation axis "X" extending through the base of the prism; the projection "X'" of the axis "X" of rotation on the plane of the punched carrier 1 is matched with the above-mentioned straight line "a". Owing to such a design of the reflector 10, only one information hole 2 of the information combination of holes being interrogated lets the radiation flux 8 pass from the source 7 and the reflector 10 to the respective main converter 12 during the interrogation time t.

Figure 6:
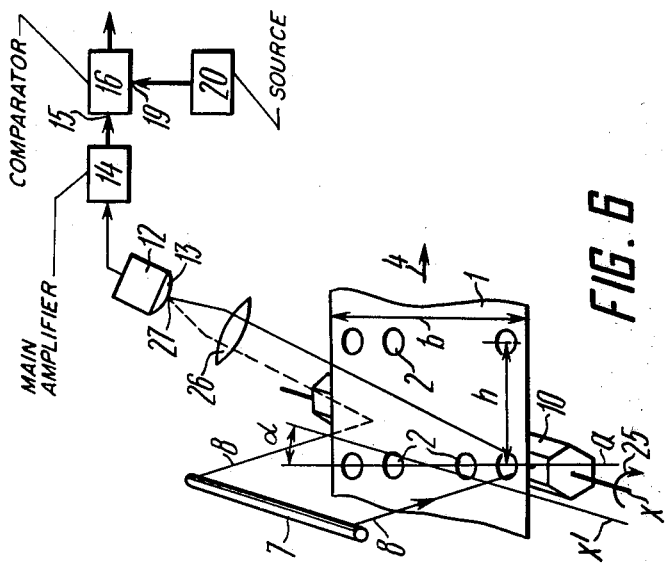
FIG. 6 is a perspective view showing a part of a device with a converging optical element, in accordance with the invention.

FIG. 6 shows a device for carrying out still another embodiment of the proposed method for reading information from a punched carrier. Like the devices of FIGS. 4 and 5, the device of FIG. 6 provides for successive reading of information from each information hole 2. Yet unlike the foregoing embodiments, in the device of FIG. 6 the reception and conversion of the radiation flux 8 modulated by the reflector 10, which also performs the functions of the additional modulation means 9 (FIG. 1), are carried out only in one information channel 11. This is due to the fact that between the main converter 12 and the punched carrier 1, across the path of the radiation flux 8 and in immediate proximity to the main converter 12, there is interposed an optical converging element 26 which focuses in a common point 27 the total radiation flux 8 which successively passes through each information hole 2 of the information combination of holes being interrogated. The photosensitive element 13 of the main converter 12 is located at the common point 27. The primary information signals, successively arriving from the output of the main converter 12, are applied via the main amplifier unit 14 to the information input 15 of the comparator 16.

The process of comparing and discriminating the preset information signal further proceeds as described above.

Successive readout of information from each information combination of holes being interrogated expands the potentialities of the device and is a factor that can further improve the reliability of the readout process. In addition, the foregoing embodiments of the proposed method, which provide for successive readout of information, make it possible to simplify the design of the device (FIG. 6) to a degree when only one information channel 11 is incorporated in the device.

Figure 7:
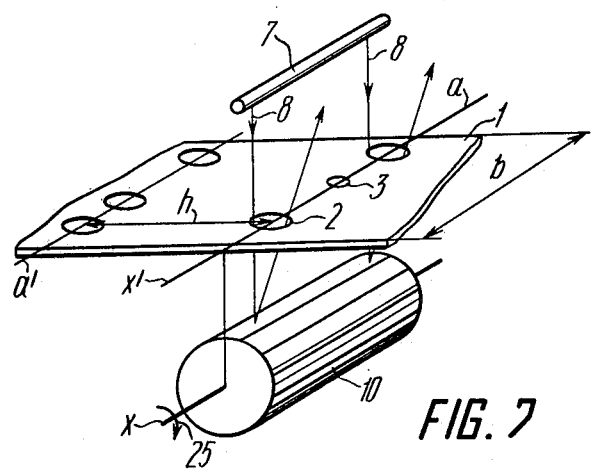
FIG. 7 is a perspective view showing a cylinder-shaped reflector, in accordance with the invention.

FIG. 7 shows a reflector 10 constructed as a cylinder rotatable around the axis "X" of rotation extending through its base. The side surface of the cylinder is composed of strips having different optical properties.

As in the case of the prism-shaped reflector 10 (FIG. 5), the reflector 10 of FIG. 7 provides for additional modulation of the radiation flux 8 with regard to different parameters, such as color, luminance, etc. It is necessary, however, that the length of the projection of any strip of the cylinder's side surface on the plane of the punched carrier 1 should be greater than or equal to the width "b" of the punched carrier 1, whereas the projection "X'" of the rotation axis "X" on the plane of the punched carrier 1 should be at an angle α (FIG. 6) to the straight line "a" (FIG. 7) passing through the centers of the information holes 2 of the information combination of holes being interrogated. As in the case of the prism-shaped reflector 10 (FIGS. 4 and 6), the device of FIG. 7 provides for both simultaneous (α=0) and successive $$(0 < \alpha < \text{arcctg } b/h) \quad (3)$$

passage of the radiation flux 8 through the information holes 2 of the information combination of holes being interrogated.

Figure 8:
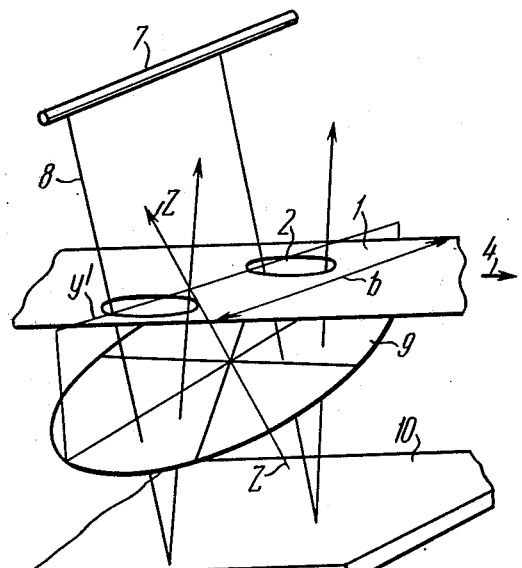
FIG. 8 is a perspective view showing a disc-type additional modulation means and a portion of a punched carrier, in accordance with the invention.

FIG. 8 shows another embodiment of the proposed device for effecting the method for reading information from a punched carrier in accordance with the invention. In the device of FIG. 8, additional modulation is carried out with the aid of the additional modulation means 9 interposed between the punched carrier 1 and the reflector 10.

The additional modulation means 9 is a disc rotatable about a rotation axis "Z" extending through the center of the disc and intersecting the plane of the punched carrier 1. The diameter of the disc is selected so that the projection "y" of the diameter on the plane of the punched carrier 1 is about equal to the width "b" of the punched carrier 1. The sectors of the disc have different light transmission coefficients; the opposite sectors, defined by one pair of diameters, have an equal light transmission coefficient so that the radiation flux 8, passing through the information holes 2 of the information combination of holes being interrogated, should be additionally modulated in the same way, without any time shift. The reflector 10 has a constant reflection coefficient.

Figure 9:
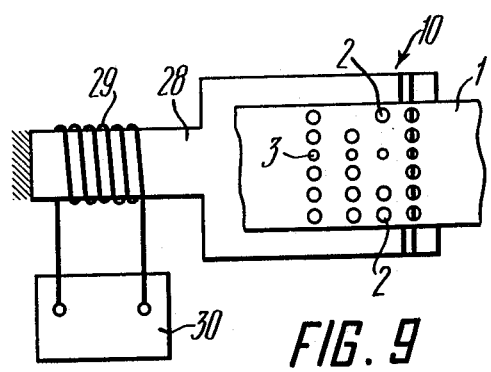
FIG. 9 is a plan view an additional modulation means constructed as a plate of a magnetoceramic material, in accordance with the invention.

FIG. 9 shows an additional modulation means 9 comprising a plate 28 of a magnetoceramic material, an inductance coil 29 and a current pulse souce 30. The narrow end of the plate 28 is rigidly secured inside the inductance coil 29. The ends of the inductance coil 29 are connected to the terminals of the current pulse source 30. The wide end of the plate 28 is below the punched carrier 1 and extends parallel to the carrier's surface. The wide end of the plate 28 serves as the reflector 10, as it is provided with reflecting strips having different reflection coefficients.

The application of current pulses from the source 30 results in a change in the linear dimensions of the plate 28 (an increase in the amplitude of the pulse leads to an increase in the length of the plate 28, and vice versa); as a result, the reflecting strips of the reflector 10 are shifted with respect to their original position. The way the current is changed in the inductance coil 29 directly affects the additional modulation pattern.

Figure 10:
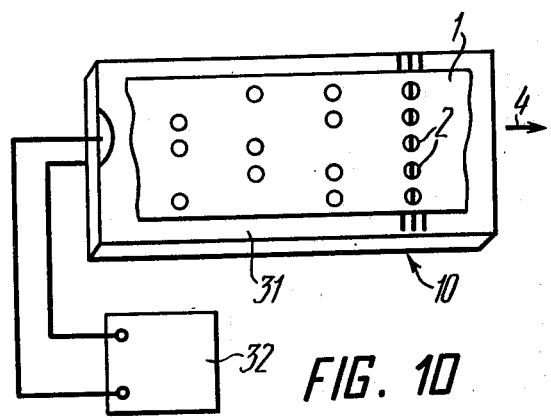
FIG. 10 is a plan view an additional modulation means comprising a plate of a piezoelectroc material, in accordance with the invention.

FIG. 10 shows another embodiment of an additional modulation means 9 which comprises a plate 31 of a piezoelectric material and a voltage pulse source 32. One of the ends of the plate 31 is rigidly secured, for example, on the base 6 (FIG. 1) of the drive mechanism 5 for transporting the punched carrier 1. On the same end of the plate 31 (FIG. 12) there is mounted a pair of electrodes connected to the terminals of the source 32. The opposite end of the plate 31 is below the punched carrier 1 and extends in parallel with its surface. On the same end of the plate 31 there are provided reflecting strips which perform the function of the reflector 10. The strips are parallel with the straight line "a" drawn through the centers of the information holes 2 of the information combination of holes being interrogated. The strips have different optical properties, for example, different reflection coefficients.

As in the foregoing embodiment, voltage pulses arriving from the source 32 produce an electric field which changes the dimensions of the plate 31 (an increase in the voltage brings about an increase in the plate's length, and vice versa); as a result, the reflecting strips are shifted with respect to their original position, whereby the radiation flux 8 is luminance-modulated.

Figure 11:
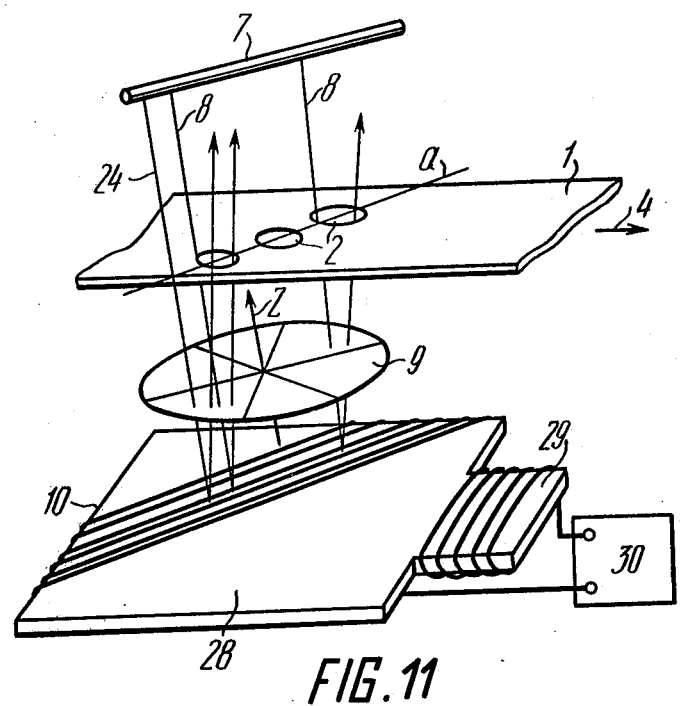
FIG. 11 is a perspective view showing an additional modulation means comprising a disc and a plate of a magnetoceramic material, in accordance with the invention.

FIG. 11 shows another embodiment of the device for reading out information from the punched carrier 1, in accordance with the invention. In this case, the radiation flux 8 is adaditionally modulated by means of an additional modulation means 9 comprising a disc (like the one of FIG. 8) with sectors having different transmission coefficients, and the plate 28 (FIG. 9) of a magnetoceramic material. At the free end of the plate 28 there are provided strips with different reflection coefficients. Owing to such a design of the additional modulation means 9 (FIG. 11), the additional modulation of the radiation flux 8 is carried out by rotating the disc and applying current pulses from the source 30. This provides for complex modulation, especially if the rotational frequency of the disc and the current pulse repetition frequency differ in the order of scores of times. In this case it is impractical to use the reference signal source 20 (FIG. 1), because the additional modulation is practically unreproducible. The reference signal is produced in this case by converting the reference radiation flux 24 (FIG. 11).

Complex modulation can be provided for in a similar manner by combining two different units in a single additional modulation means 9. For example, the additional modulation means 9 may comprise a disc (FIG. 8) rotatable about a rotation axis "Z" and a reflector 10 (FIG. 3) which is a prism whose side faces have different optical properties, for example, different color or reflection coefficients.

Figure 12:
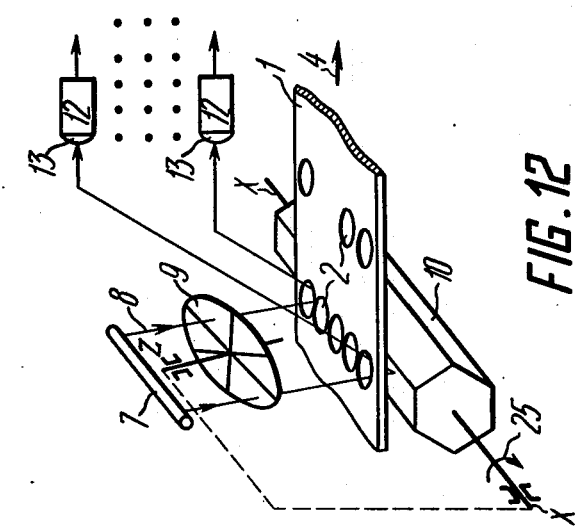
FIG. 12 is a perspective view showing an additional modulation means which carries out additional modulation of the radiation flux with the aid of a disc and a prism-shaped reflector, in accordance with the invention.

FIG. 12 shows part of a device for effecting another of the embodiments of the proposed method for reading information from a punched carrier. According to FIG. 12, the radiation flux 8 is additionally modulated by changing the optical properties of the reflector 10. In order to provide for a more complex modulation, the additional modulation means 9 comprises a disc rotatable about a rotation axis "Z" which is mechanically coupled to the rotation axis "X" of a prism performing the function of the reflector 10. The disc's sectors have different transmission coefficients and different colour. Rotation of the disc through an angle of 30° is accompanied by rotation of the prism through the same angle. The reference signal is produced by converting the reference radiation flux 24. The rotational frequency of the disc is equal to that of the prism, which makes it easier to realize the present embodiment of the device.

Figure 13:
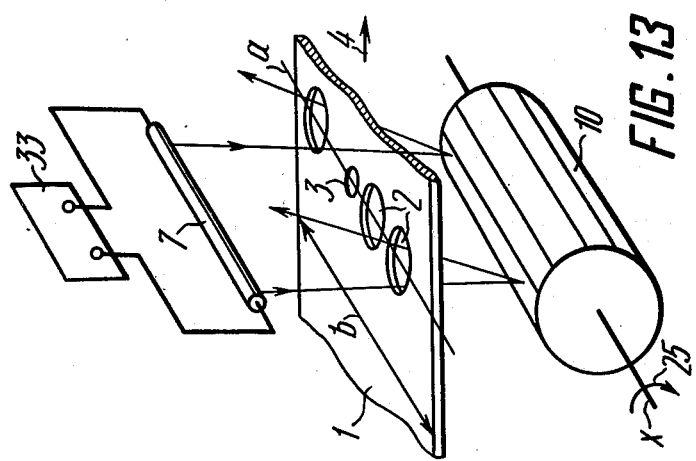
FIG. 13 is a perspective view showing an embodiment, wherein the radiation source operates in the pulse mode, in accordance with the invention.

In the device of FIG. 13, the radiation flux 8 is additionally modulated with the aid of the reflector 10 and an electric pulse source 33 which make up the additional modulation means 9 (FIG. 1). The reflector 10 is constructed as the one of FIG. 9, so it also takes part in the additional modulation process. The source 33 is connected to the radiation source 7. The presence of source 33 accounts for the pulse operating mode of the radiation source 7, whereby the radiation flux 8 is additionally modulated with regard to the pulse repetition frequency. The moment the source 33 is disconnected corresponds to the moment the boundary between two strips passes under the information holes 2; as a result, there is eliminated the ambigous reading of information which occurs when the radiation flux 8 is reflected from the boundary between the strips having different reflection coefficients.

Figure 14:
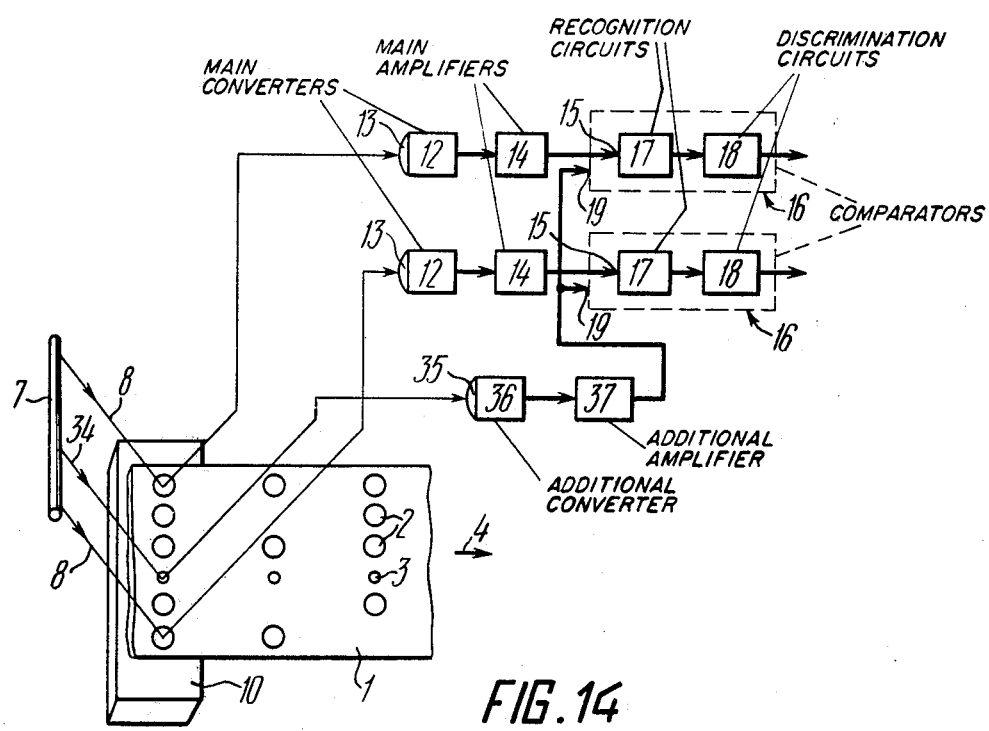
FIG. 14 is a schematic diagram showing a device which makes use of a synchronizing radiation flux to produce a reference signal, in accordance with the invention.

FIG. 14 is a schematic diagram of a device for effecting another of the preferred embodiments of the proposed method for reading information from the punched carrier 1. In this case, part of the radiation flux 8 passes through the synchronizing hole 3, as is the case with the known readout device. Then, the part of the radiation flux 8, that has passed through the synchronizing hole 3 and is a synchronizing radiation flux 34, is reflected and at the same time additionally modulated by the reflector 10 performing the functions of the additional modulation means 9 (FIG. 1). The additional modulation is effected by varying the optical properties of the reflector 10 (FIG. 14) and thus changing the parameters of the radiation flux 8 reflected by the reflector 10.

The synchronizing radiation flux 34 then reaches a photosensitive element 35 of an additional converter 36 and, aided by an additional amplifier unit 37, and is converted into a reference signal. As in the device of FIG. 3, the characteristics of the additional amplifier unit 37 and the additional converter 36 fully coincide with those of the main amplifier unit 14 and the main converter 12. Due to the fact that part of the radiation flux 8 is passed through the synchronizing hole 3 belonging to the same information combination being interrogated as the holes 2, through which there passes the entire radiation flux 8, the reference signal performs the functions of a synchronizing signal whose leading edge determines the onset of comparison performed by the comparator 16, whereas its trailing edge determines the onset of discrimination of the preset information signal. In this case, as in the case of the device of FIG. 2, it is unnecessary to use the reference signal source 20.

The reflector 10 may be of any type shown in FIGS. 3, 4, 5, 6, 8, 9, 10 and 12.

Figure 15:
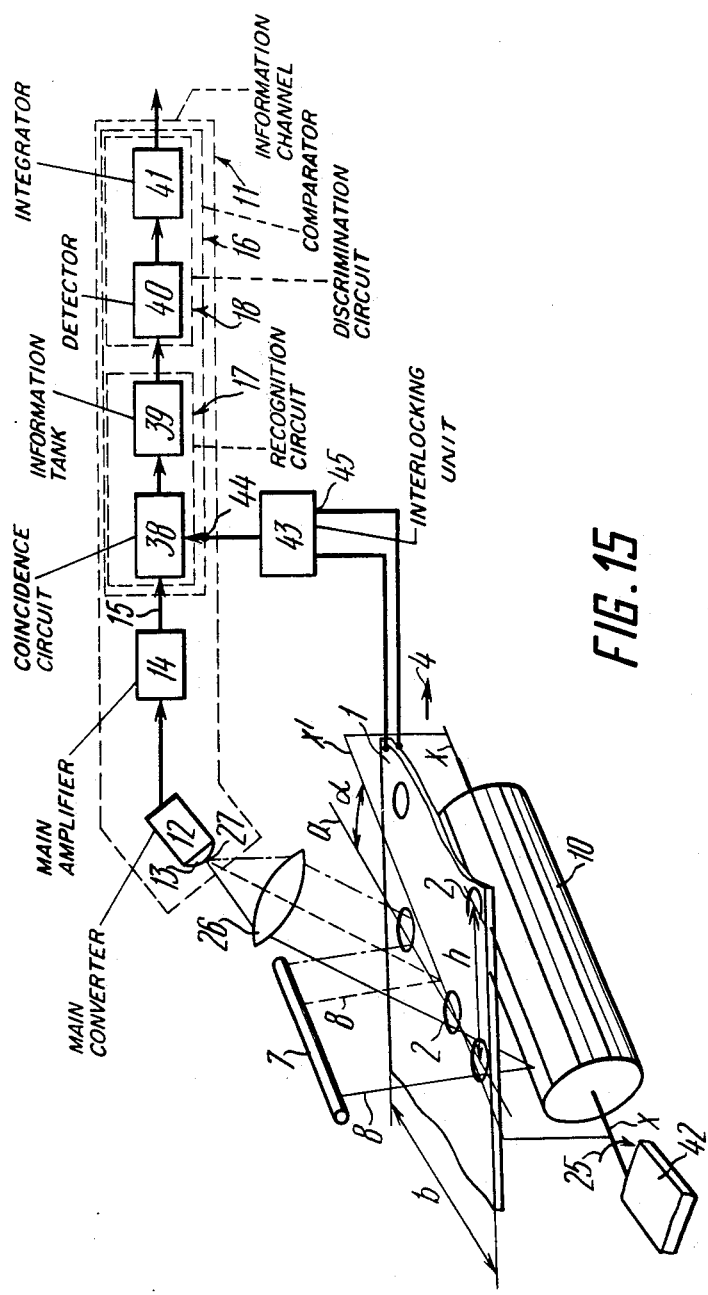
FIG. 15 is a perspective view and a block diagram of a device for effecting one of possible modifications of the proposed method for reading information from a punched carrier.

FIG. 15 is a block diagram of a device for effecting another of the embodiments of the proposed method of reading information from a punched carrier. As the device of FIG. 3, the device of FIG. 15 carries out successive reading of information from the punched carrier 1. The photosensitive element 13, placed at the input of the main converter 12, is located at the common point 27 which is the focus of the optical converging element 26. The output of the main converter 12 is connected via the main amplifier unit 14 to the information input 15 of the comparator 16, wherein the recognition circuit 17 comprises a coincidence circuit 38 and an information tank 39 for accumulating information on the reference signal. The coincidence circuit 38 and the information tank 39 are placed in series, the information tank 39 being a band-pass filter. The preset information signal discrimination circuit 18 comprises a detector 40 and an integrator 41 placed in series. The additional modulation means 9 (FIG. 1) comprises a drive mechanism 42 (FIG. 15) to rotate the cylinder around the "X" axis. The cylinder acts as the reflector 10. The side surface of the cylinder is composed of strips with different reflection coefficients which are conventionally selected to be equal to 1 or 0. The projection "x'" of the rotation axis "x" on the plane of the punched carrier 1 is at an angle $$0 < \alpha < \text{arcctg } b/h \qquad (3)$$

to the straight line "a" drawn through the centers of the information holes 2 of the information combination of holes being interrogated. The punched carrier 1 is connected to an interlocking unit 43 which continuously produces an interlocking signal applied to an interlocking input 44 of the comparator 16. The interlocking unit 43 comprises a control circuit 45 with contacts arranged on both sides of the punched carrier 1. The contacts are in touch with the upper and lower surfaces of the punched carrier 1. In case of a rupture of the punched carrier 1, the contacts are brought together and close the control circuit 45 which generates a control signal to actuate the interlocking unit 43.

The radiation flux 8 is modulated by each information hole 2 of the information combination of holes being interrogated; it is also luminance-modulated by the reflector 10. Suppose the side surface of the cylinder is composed of nine strips with reflection coefficients conventionally selected to be equal to 1, 1, 0, 1, 1, 0, 1, 1 and 0, respectively. During the interrogation time t, the radiation flux 8, which passes through one information hole 2 of the information combination of holes being interrogated and through the optical converging element 26, is applied to the input of the main converter 12; as a result, at the output of the main converter 12 there is produced a primary information signal which is a train of pulses. The primary information signal is amplified by the main amplifier unit 14 and applied to the information input 15 of the comparator 16, which is the first input of the coincidence circuit 38. To the interlocking input 44 of the comparator 16, which is the second input of the coincidence circuit 38, from the interlocking unit 43 there continuously arrives an interlocking signal indicating the absence of a rupture of the punched carrier 1. As a result, the primary information signal reaches the output of the coincidence circuit 38 and is applied to the input of the band-pass filter which performs the function of the reference signal information tank 39. The passband of the filter is selected so as to pass the pulse repetition frequency f of the primary information signal which is produced due to the conversion of the information radiation flux (shown by the solid line in FIG. 15). If the radiation flux 8 is modulated by the information hole 2 of the information combination of holes being interrogated and the additional modulation means 9, the pulse repetition frequency f of the primary information signal is necessarily within the passband of the band-pass filter; as a result, at the filter's output there is produced a sinusoidal electric signal which is applied to the preset information signal discrimination circuit 18. The output signal of the band-pass filter is detected by the detector 40, integrated by the integrator 41 and appears as the preset information signal at the output of the preset information signal discrimination circuit 18. The preset information signal is produced in a similar manner as regards the rest of the information holes 2 of the information combination of holes being interrogated.

If the punched carrier 1 breaks or comes to an end, at the outputs of the main converter 12 and the main amplifier unit 14 there is produced a primary information signal. The comparator 16 might recognize this signal as the preset information signal, which, in fact, it is not. In this case, under the action of a control signal arriving from the control circuit 45, the interlocking unit 43 stops producing the interlocking signal; as a result, the coincidence circuit 38 does not let the primary information signal reach the input of the band-pass filter.

If the reflected side radiation flux (see the dotted line in FIG. 15) reaches the input of the converter 12, the primary information signal, which in this case appears at the output of the main converter 12, is recognized to be a spurious signal by the circuit 17. The reason is that this primary signal is a single pulse which is not passed by the band-pass filter, so no signal is applied to the input of the preset signal discrimination circuit 18.

The presence of the band-pass filter, which performs the function of the reference signal information tank 39, makes it unnecessary to use the reference signal source 20 (FIG. 1) and apply reference signals to the synchronizing input 19 of the comparator 16.

Figure 16:
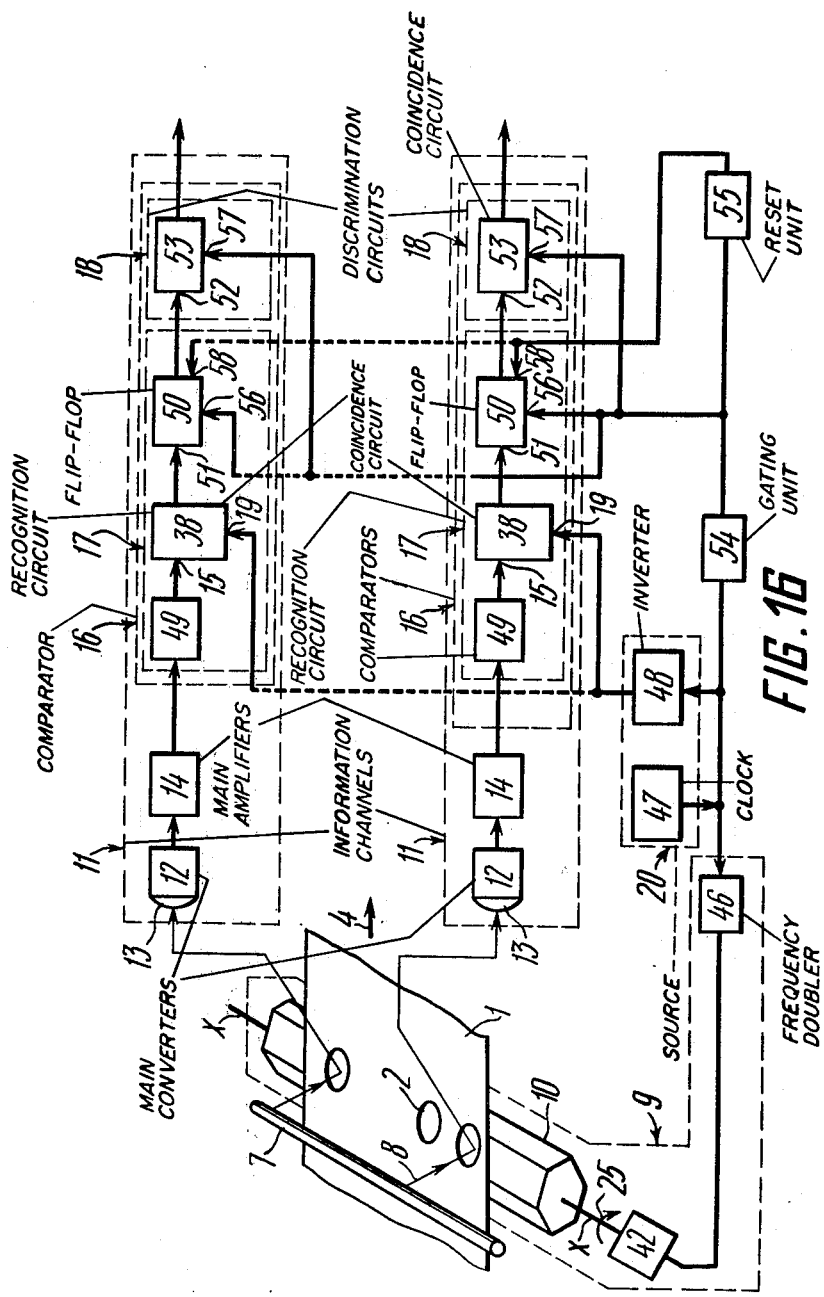
FIG. 16 is a block diagram of a device for carrying out one of the embodiments of the proposed method for reading information from a punched carrier.

FIG. 16 is a block diagram of a device for effecting another of the foregoing embodiments of the proposed method for reading information from a punched carrier.

In the additional modulation means 9, the reflector 10 is constructed as a prism rotatable about the rotation axis "X". The prism is rotated by the drive mechanism 42. The additional modulation means 9 further includes a frequency doubler 46 whose input is connected to the output of a clock pulse generator 47 which makes up, in conjunction with an inverter 48, the reference signal source 20. The six side faces of the prism have different reflection coefficients conventionally selected to be respectively equal to 1, 0, 1, 0, etc.

The number of the information channels 11 is equal to the maximum possible number of the information holes 2 in the information combination of holes being interrogated (only two information channels 11 are shown in FIG. 16). Each information channel 11 receives the radiation flux 8 from the respective information hole 2, which radiation flux 8 has been additionally modulated by the additional modulation means 9.

The recognition circuit 17 of the comparator 16 comprises a switching circuit 49, the coincidence circuit 38 and a flip-flop 50, connected in series. The output of the switching circuit 49 is connected to the first input of the coincidence circuit 38, which is the information input 15 of the comparator 16; the output of the coincidence circuit 38 is connected to an information input 51 of the flip-flop 50; the output of the flip-flop 50 is connected to an input 52 of a second coincidence circuit 53 which performs the functions of the preset information signal discrimination circuit 18 (FIG. 1). The reference signal source 20 (FIG. 16) comprises the clock pulse generator 47 connected in series to the inverter 48 whose output is connected to the second input of the coincidence circuit 38, which is the synchronizing input 19 of the comparator 16 of each information channel 11. The output of the clock pulse generator 47 is connected to a gating unit 54 which is a frequency divider designed for dividing the frequency by three. The output of the generator 47 is connected via the gating unit 54 to a reset unit 55 constructed as a delay circuit.

The output of the gating unit 54 is connected to gating inputs 56 and 57 of the flip-flop 50 and the second coincidence circuit 53, respectively, of each information channel 11. The output of the reset unit 55 is connected to a reset input 58 of each flip-flop 50.

Operation of the device is illustrated by the voltage and current plots in FIGS. 17a–17k. As the clock pulse generator 47 (FIG. 16) is switched on, it generates a sequence of clock pulse (FIG. 17a) whose repetition frequency is $f_1$. Through the doubler 46 (FIG. 16) and the drive mechanism 42, which includes an electric pulse circuit (not shown in FIG. 16), said sequence of pulses rotates the reflector 10 around the rotation axis "X" at a rotational frequency $f_2=2f_1$. FIG. 17b shows a train of pulses at the output of the doubler 46 (FIG. 16). During the clock pulse period $T_1$ (FIG. 17b), under the information holes 2 (FIG. 16) of the information combination of holes being interrogated, there pass one side face of the prism, having a reflection coefficient equal to 1, and one side face having a reflection coefficient equal to 0. During the interrogation time t, the generator 47 generates a sequence of three pulses (FIG. 17a). During the same period of time, the reflector 10 (FIG. 16) makes one complete revolution, so that under the information combination of holes being interrogated there pass all six side faces of the prism, which ensures luminance modulation of the radiation flux 8 received by the photosensitive element 13 of each main converter 12.

At the output of each main converter 12 there is produced a primary information signal (FIG. 17c) which is a sequence of three pulses at a frequency f equal to the clock pulse repetition frequency $f_1$. In each information channel 11, the sequence of pulses is then applied via the main amplifier unit 14 to the switching circuit 49. The signal produced at the output of the main amplifier unit 14 is shown in FIG. 17d. The leading edge of each pulse of this signal switches on the circuit 49 (FIG. 16), while the trailing edge switches it off (FIG. 17f).

The phase of the primary information signal is opposite to that of the phase of the reference signal (FIG. 17e) arriving from the output of the inverter 48 (FIG. 16), so there is no signal at the output of the coincidence circuit 38, and the state of the flip-flop 50 is not changed (FIG. 17g); it is assumed that at the initial state the voltage across the output of the flip-flop 50 corresponds to logical "1". During the interrogation time t, the state of each flip-flop 50 is established at a moment of time $t_n$ by switching it to logical "0" by a gate pulse (FIG. 17h) produced at the output of the gating unit 54 (FIG. 16) which is a divide-by-three circuit. The same gate pulse is applied to the gating input 57 of the second coincidence circuit 53; as a result, at the output of the circuit 53 there is produced a pulse (FIG. 17i) which is the preset information signal. When the checking of the state of the flip-flops 50 (FIG. 16) by the gate pulse is over, the flip-flops 50 are reset by a reset pulse (FIG. 17k) arriving from the output of the reset unit 54 (FIG. 16) constructed as a delay circuit which delays each third clock pulse by a delay time t equal to:

$$t_{delay} = t_{interrogation} - \tau_{gate} \qquad (4),$$

where $\tau_{gate}$ is the duration of the gate pulse.

If in the course of movement of the punched carrier 1 the next information combination passes over the reflector 10, the foregoing process is repeated. If the reflected side flux reaches the input of any of the main converters 12 at a moment of time $t_x$, at the output of the main converter 12 there is produced a primary signal which is a pulse (FIG. 17c) with a duration greater than that of the clock pulse. At the output of the switching circuit 49 there is produced a constant signal (FIG. 17f). At the moment of the arrival of the reference signal of the same phase (FIG. 17e), the constant signal brings about the appearance of an output signal at the output of the coincidence circuit 38, which is followed by resetting the respective flip-flop 50. The moment $t_x$ of resetting the flip-flop 50 does not coincide with the moment of the arrival of the next gate pulse from the gating unit 54 at the gating input 57 of the second coincidence circuit 53; as a result, the second coincidence circuit does not send the spurious signal to the output of the preset information signal discrimination circuit 18 (FIG. 16). During the interrogation time t that follows, the flip-flop 50 is in its "0" state which is maintained until the arrival of a reset pulse from the reset unit 55, whereby the flip-flop 50 is reset prior to the start of the next interrogation cycle.

What is claimed is:

1. A method for reading information from a punched carrier, comprising the following successively performed operations:
   modulating a radiation flux, emitted by a radiation source, by information holes of an information combination of holes being interrogated of the punched carrier;
   additionally modulating the radiation flux, modulated by the information holes of the punched carrier, by an additional modulation means;
   reflecting the radiation flux by a reflector;
   converting the radiation flux, reflected by the reflector, into primary information signals;
   comparing said primary information signals with a reference signal whose parameters vary according to the pattern of said additional modulation; and
   generating a present information signal if the the primary information signal coincides with the reference signal.

2. A method as claimed in claim 1, wherein said additional modulation of the radiation flux is carried out simultaneously with the reflection by changing the optical properties of the reflector with time.

3. A method as claimed in claim 2, further comprising the operation of changing the reflection coefficient of said reflector.

4. A method as claimed in claim 2, further comprising the operation of changing the wavelength of said radiation flux reflected by said reflector.

5. A method as claimed in claim 2, wherein said reflection and additional modulation are simultaneously accompanied by successively directing the radiation flux through each information hole of the information combination of holes being interrogated, and then converting the radiation flux into successive primary information signals.

6. A method as claimed in claim 5, further comprising the operation of optically refracting said radiation flux reflected by said reflector.

7. A method as claimed in claim 6, further comprising the following operations:
modulating another part of the radiation flux, which is the synchronizing flux, by the synchronizing hole of said combination of holes being interrogated;
additionally modulating said synchronizing flux by said additional modulation means in accordance with the pattern of additional modulation of the radiation flux;
reflecting said synchronizing flow by said reflector; and
converting said synchronizing flow into said reference signal.

8. A method as claimed in claim 6, further comprising the following operations:
modulating a part of said radiation flux, which is the reference flux, by only said additional modulation means in accordance with the pattern of additional modulation of said radiation flux;
reflecting said reference flux by said reflector; and
converting said reference flux into said reference signals.

9. A method as claimed in claim 2, further comprising the following operations:
modulating a part of said radiation flux, which is the reference flux, by only said additional modulation means in accordance with the pattern of additional modulation of said radiation flux;
reflecting said reference flux by said reflector simultaneously with said additional modulation; and
converting said reference flux into reference signals.

10. A method as claimed in claim 2, further comprising the following operations:
modulating another part of the radiation flux, which is the synchronizing flux, by the synchronizing hole of said combination of holes being interrogated;
additionally modulating said synchronizing flux, by said additional modulation means in accordance with the pattern of additional modulation of said radiation flux, simultaneously with reflecting said synchronizing flux by said reflector; and
converting said synchronizing flux into said reference signals.

11. A method as claimed in claim 1, wherein said additional modulation is carried out simultaneously with successively directing the radiation flux through each information hole of the information combination of holes being interrogated, and then converting the radiation source, reflected by the reflector, into successive primary information signals.

12. A method as claimed in claim 11, further comprising the operation of optically refracting said radiation flux reflected by said reflector.

13. A method as claimed in claim 11, further comprising the following operations:
modulating a part of said radiation flux, which is the reference flux, by only said additional modulation means in accordance with the pattern of additional modulation of said radiation flux;
reflecting said reference flux by said reflector; and
converting said reference flux into said reference signals.

14. A method as claimed in claim 11, further comprising the following operations:
modulating another part of the radiation flux, which is the synchronizing flux, by the synchronizing hole of said combination of holes being interrogated;
additionally modulating said synchronizing flux by said additional modulation means in accordance with the pattern of additional modulation of the radiation flux;
reflecting said synchronizing radiation flux by said reflector; and
converting said synchronizing radiation flux into said reference signal.

15. A method as claimed in claim 1, further comprising the following operations:
modulating a part of said radiation flux, which is a reference flux, by only said additional modulation means in accordance with the pattern of additional modulation of said radiation flux;
reflecting said reference flux by said reflector; and
converting said reference flux into said reference signals.

16. A method as claimed in claim 1, further comprising the following operations:
modulating another part of the radiation flux, which is a synchronizing flux, by a synchronizing hole of said combination of holes being interrogated;
additionally modulating said synchronizing flux by said additional modulation means in accordance with the pattern of additional modulation of the radiation flux;
reflecting the synchronizing flux by the reflector; and
converting said synchronizing flux into said reference signal.

17. A device for effecting the method for reading information from a punched carrier as set forth in claim 1, comprising:
a radiation source emitting a radiation flux;
a drive mechanism for advancing said punched carrier mechanically coupled to said punched carrier;
an additional modulation means for additional modulation of said radiation flux modulated by information holes of an information combination of holes being interrogated;
a reflector, to reflect said radiation source, optically connected through said information holes and said additional modulation means to said radiation source; and
at least one information channel comprising:
a main converter, with a photosensitive element placed at its input, optically connected to said reflector to convert said radiation flux, reflected by said reflector, into a primary information signal;
a main amplifier unit placed in series with said main converter;
a comparator having
an information input connected to an output of said main amplifier unit and a synchronizing input;

a preset information signal recognition circuit of said comparator, to recognize a preset information signal by comparing said primary information signal with a reference signal applied to said synchronizing input of said comparator;

a preset information signal discrimination circuit of said comparator connected to an output of said preset information signal recognition circuit and producing said preset information signal at the output of said comparator; wherein said additional modulation means effects additional modulation of said radiation flux in accordance with fluctuations in the parameters of said reference signal.

18. A device as claimed in claim 17, wherein:

said additional modulation means is constructed as a disc interposed between said punched carrier and said reflector, an axis of rotation of said disc intersecting the plane of said punched carrier, sectors of said disc possessing different transmission coefficients with regard to said radiation flux, a length of a projection of a diameter of said disc on the plane of said punched carrier being greater than the width of said punched carrier.

19. A device as claimed in claim 17, wherein said additional modulation means includes an electric pulse source connected to said radiation source.

20. A device as claimed in claim 17, further comprising:

a reference signal source having output connected to said synchronizing input of said comparator of each of said information channels.

21. A device for reading information from a punched carrier, comprising:

a radiation source emitting a radiation flux;

a drive mechanism for advancing said punched carrier mechanically coupled to said punched carrier, an additional modulation means for additional modulation of said radiation flux modulated by information holes of an information combination of holes being interrogated of said punched carrier;

a reflector reflecting said radiation flux and optically connected through said information holes and said additional modulation means to said radiation source; and at least one information channel comprising:

a main converter having at its imput a photo-sensitive element optically connected to said reflector, and converting said radiation flux, reflected by said reflector, into a primary information signal;

a main amplifier unit placed in series with said main converter;

a comparator having an information input connected to an output of said main amplifier unit , and a synchronizing input;

a preset information signal recognition circuit of said comparator, to recognize a preset information signal by comparing said primary information signal with a reference signal applied to said synchronizing input of said comparator;

a preset information signal discrimination circuit of said comparator having an input connected to an output of said preset information signal recognition circuit, and producing said preset information signal at the output of said comparator; wherein said additional modulation means effects additional modulation of said radiation flux according to fluctuations in the parameters of said reference signal.

22. A device for reading information from a punched carrier, as claimed in claim 21, further comprising:

an additional converter with a photosensitive element placed at its input;

an additional amplifier unit having an output connected to said synchronizing input of said comparator, and an input connected to an output of said additional converter; and a reference radiation flux, which is a part of said radiation flux, modulated by only said additional modulation means and reflected by said reflector; wherein said additional converter is optically connected to said reflector; and said additional converter converts said reference radiation flux into said reference signal to be applied via said additional amplifier unit to said synchronizing input of said comparator.

23. A device as claimed in claim 22, wherein said additional modulation means comprises:

an inductance coil arranged in immediate proximity to said punched carrier;

a current pulse source having terminals connected to said inductance coil;

a plate of a magnetoceramic material having a first end rigidly secured inside said inductance coil and a second end parallel to the plane of said punched carrier; and strips possessing different optical properties provided on the surface of said opposite end of said plate, said strips performing the function of said reflector.

24. A device as claimed in claim 23, wherein:

said additional modulation means is constructed as a disc interposed between said punched carrier and said reflector, an axis of rotation of said disc intersecting the plane of said punched carrier, sectors of said disc possessing different transmission coefficients with regard to said radiation flux, a length of a projection of said diameter of said disc on the plane of said punched carrier being greater than the width of said punched carrier.

25. A device as claimed in claim 22, wherein:

said additional modulation means is constructed as a disc interposed between said punched carrier and said reflector, an axis of rotation of said disc intersecting the plane of said punched carrier sectors of said disc possessing different transmission coefficients with regard to said radiation flux, a length of a projection of a diameter of said disc on the plane of said punched carrier being greater than the width of said punched carrier.

26. A device as claimed in claim 22, wherein said reflector serves as said additional modulation means and possesses optical properties which vary with time.

27. A device as claimed in claim 26, wherein said reflector is capable of exhibiting a change in its coloration.

28. A device as claimed in claim 26, wherein said reflector possesses a variable reflection coefficient.

29. A device as claimed in claim 28, wherein:
said reflector is constructed as a regular right-angle prism rotatable about a rotation axis and having
side faces possessing different optical properties, a length of
a projection of any of said side faces of said prism on the plane of said punched carrier
being greater than the width of said punched carrier,
said projection of said rotation axis being matched with a straight line through the centers of said information holes of said information combination of holes being interrogated of said punched carrier.

30. A device as claimed in claim 29, further comprising:
an interlocking unit connected to said punched carrier and having an output connected to an interlocking input of said comparator; wherein
said preset information signal discrimination circuit includes in series:
a voltage detector having an input connected to said input of said discrimination circuit, and an output;
and an integrator having an input connected to said output of said voltage detector, and an output connected to said output of said discrimination circuit;
said preset information signal recognition circuit includes in series:
a coincidence circuit having a first input connected to said information input of said comparator, a second input connected to said interlocking input of said comparator, and an output; and
an information tank for accumulating information on the reference signal having an input connected to said output of said coincidence circuit, and an output connected to said output of said recognition circuit; and
said primary information signal is produced in the form of a train of pulses by converting said radiation flux that has successively passed through each information hole of said information combination of holes being interrogated.

31. A device as claimed in claim 30, wherein said information tank is constructed as an electronic filter, the resonance frequency of said electronic filter being equal to the repetition frequency of said pulses of said primary information signal.

32. A device as claimed in claim 28, wherein:
said reflector is constructed as a cylinder rotatable about a rotation axis and
having a side surface composed of strips possessing different optical properties,
said strips being parallel to said rotation axis, a length of
a projection of said side surface of said cylinder on the plane of said punched carrier
being greater than the width, "b", of said punched carrier,
a projection of said rotation axis of said cylinder on the plane of said punched carrier being at an angle $0 < \alpha <$ arcctg $b/h$ to a straight line through the centers of said information holes of said information combination of holes being interrogated of said punched carrier.

33. A device as claimed in claim 32, wherein said additional modulation means includes an electric pulse source connected to said radiation source.

34. A device as claimed in claim 26, wherein
said reflector is constructed as a regular right-angle prism rotatable about a rotation axis and having
side faces possessing different optical properties, the length of
a projection of any of said side faces of said prism on the plane of said punched carrier
being greater than the width of said punched carrier,
a projection of said rotation axis of said prism on the plane of said punched carrier matching
a straight line through the centers of said information holes of said information combination of holes being interrogated of said punched carrier.

35. A device as claimed in claim 34, wherein:
said additional modulation means is constructed as a disc interposed between said punched carrier and said reflector,
an axis of rotation of said disc intersecting the plane of said punched carrier
sectors of said disc possessing different transmission coefficients with regard to said radiation flux, a length of
a projection of a diameter of said disc on the plane of said punched carrier being greater than the width of said punched carrier.

36. A device as claimed in claim 26, wherein:
said reflector is constructed as a regular right-angle prism rotatable about a rotation axis and having
side faces possessing different optical properties, a length of
a projection of any of said side faces of said prism on the plane of said punched carrier
being greater than the width, "b", of said punched carrier,
a projection of said rotation axis on the plane of said punched carrier
being at an angle $0 < \alpha <$ arcctg $b/h$ to a straight line through the centers of said information holes of said information combination of holes being interrogated of said punched carrier, h being the distance between two adjacent information combinations of holes.

37. A device as claimed in claim 21, further comprising:
an additional converter with a photosensitive element placed at its input;
an additional amplifier unit having an input connected to an output of said additional converter, and an output connected to said synchronizing input of said comparator; and
a synchronizing radiation flux, which is a part of said radiation flux, modulated by said synchronizing hole of said information combination of holes being interrogated, additionally modulated by said additional modulation means, and reflected by said reflector; wherein
said additional converter is optically connected to said reflector; and
said additional converter converts said synchronizing radiation flux into said reference signal to be applied via said additional amplifier unit to said synchronizing input of said comparator.

38. A device as claimed in claim 37, wherein said reflector serves as said additional modulation means and possesses optical properties which vary with time.

39. A device as claimed in claim 38, wherein said reflector is capable of exhibiting a change in its coloration.

40. A device as claimed in claim 38, wherein said reflector possesses a variable reflection coefficient.

41. A device as claimed in claim 40, wherein:
said reflector is constructed as a regular right-angle prism rotatable about a rotation axis and having
side faces possessing different optical properties, a length of
a projection of any of said side faces of said prism on the plane of said punched carrier
being greater than the width of said punched carrier,
a projection of said rotation axis of said prism on the plane of said punched carrier matching
a straight line through the centers of said information holes of said information combination of holes being interrogated of said punched carrier.

42. A device as claimed in claim 38, wherein said additional modulation means includes an electric pulse source connected to said radiation source.

43. A device as claimed in claim 37, wherein said additional modulation means comprises:
a voltage pulse source having terminals
a plate of a piezoelectric material having
a first end rigidly mounted on a base of said drive mechanism; and a second end parallel to the plane of said punched carrier;
a pair of electrodes mounted on said first end of said plate and
connected to said terminals of said voltage pulse source; and
strips possessing different optical properties, provided on said second end of said plate and performing the function of said reflector.

44. A device as claimed in claim 21, wherein said reflector serves as said additional modulation means and possesses optical properties which vary with time.

45. A device as claimed in claim 44, wherein said reflector is capable of exhibiting a change in its coloration.

46. A device as claimed in claim 44, wherein said reflector possesses a variable reflection coefficient.

47. A device as claimed in claim 44, wherein:
said reflector is constructed as a regular right-angle prism rotatable about a rotation axis and having
side faces having different optical properties, the length of
a projection of any of said side faces of said prism on the plane of said punched carrier
being greater than the width of said punched carrier,
a projection of said rotation axis of said prism on the plane of said punched carrier matching
a straight line through the centers of said information holes of said information combination of holes being interrogated of said punched carrier.

48. A device as claimed in claim 47, further comprising:
a reference signal source having an
output connected to said synchronizing input of said comparator of each of said information channels.

49. A device as claimed in claim 48, further comprising:
a gating unit having an output; and
a reset unit having an input;
wherein the number of said information channels is equal to the maximum possible number of information holes in any of said information combinations of holes;
said reference signal source comprises:
a clock pulse generator, to generate a sequence of clock pulses and to synchronize said additional modulation means, said gating unit and said reset unit, having an output connected to said gating unit and to said reset unit.
an inverter connected to the output of said clock pulse generator for phase inversion of said sequence of clock pulses to produce said reference signal;
each of said information channels includes said preset information signal recognition circuit which comprises in series:
a switching circuit having an input connected to said information input of said comparator, and an output;
a coincidence circuit having a first input connected to said output of said switching circuit, a second input connected to said synchronizing input of said comparator, and an output;
a flip-flop having an information input connected to said output of said coicidence circuit of said recognition circuit, a reset input connected to said output of said reset unit, a gate input connected to said output of said gating unit, and an output connected to output of said recognition circuit; and
each of said information channels includes said preset information signal discrimination circuit which is designed as a coincidence circuit having an information input connected to said input of said discrimination circuit, and a gate input connected to said output of said gating unit.

50. A device as claimed in claim 44, wherein:
said reflector is constructed as a cylinder rotatable about a rotation axis and
having a side surface composed of strips possessing different optical properties,
said strips being parallel to said rotation axis of said cylinder, a length of
a projection of said side surface of said cylinder on the plane of said punched carrier
being greater than the width of said punched carrier,
a projection of said rotation axis on the plane of said punched carrier matching a straight line through the centers of said information holes of said information combination of holes being interrogated.

51. A device as claimed in claim 50, further comprising:
an interlocking unit connected to said punched carrier and having an output connected to an interlocking input of said comparator; wherein
said preset information signal discrimination circuit includes in series:
a voltage detector having an input connected to said input of said discrimination circuit, and an output;
and an integrator having an input connected to said output of said voltage detector, and an output connected to said output of said discrimination circuit;
said preset information signal recognition circuit includes in series:
a coincidence circuit having a first input connected to said information input of said comparator, a second input connected to said interlocking input of said comparator, and an output; and
an information tank for accumulating information on the reference signal having an input connected to said output of said coincidence circuit, and an output connected to said output of said recognition circuit; and said primary information signal is produced in the form of a train of pulses by converting said radiation flux that has successively passed through each information hole of said information combination of holes being interrogated.

52. A device as claimed in claim 51, wherein said information tank is constructed as an electronic filter, the resonance frequency of said electronic filter being equal to the repetition frequency of said pulses of said primary information signal.

53. A device as claimed in claim 44, further comprising:
a reference signal source having an
output connected to said synchronizing input of said comparator of each of said information channels.

54. A device as claimed in claim 53, further comprising:
a gating unit having an output; and
a reset unit having an input;
wherein the number of said information channels is equal to the maximum possible number of information holes in any of said information combinations of holes;
said reference signal source comprises:
a clock pulse generator, to generate a sequence of clock pulses and to synchronize said additional modulation means, said gating unit and said reset unit, having an output connected to said gating unit and to said reset unit;
an inverter connected to the output of said clock pulse generator for phase inversion of said sequence of clock pulses to produce said reference signal;
each of said information channels includes said preset information signal recognition circuit which comprises in series:
a switching circuit having an input connected to said information input of said comparator, and an output;
a coincidence circuit having a first input connected to said output of said switching circuit, a second input connected to said synchronizing input of said comparator, and an output;
a flip-flop having an information input connected to said output of said coicidence circuit of said recognition circuit, a reset input connected to said output of said reset unit, a gate input connected to said output of said gating unit, and an output connected to output of said recognition circuit; and
each of said information channels includes said preset information signal discrimination circuit which is designed as a coincidence circuit having an information input connected to said input of said discrimination circuit, and a gate input connected to said output of said gating unit.

55. A device as claimed in claim 21, wherein said additional modulation means comprises:
an inductance coil arranged in immediate proximity to said punched carrier;
a current pulse source having
terminals connected to
said inductance coil;
a plate of a magnetoceramic material having a first end rigidly secured inside said inductance coil and a second
end parallel to the plane of said punched carrier; and
strips possessing different optical properties provided on the surface of said second end of said plate, said strips performing the function of said reflector.

56. A device as claimed in claim 21, wherein said additional modulation means comprises:
a voltage pulse source having
terminals;
a plate of a piezoelectric material having
a first end rigidly secured on a base of said drive mechanism and a second end parallel to the plane of said punched carrier;
a pair of electrodes mounted on said first end of said plate and
connected to said terminals of said voltage pulse source; and
strips possessing different optical properties, provided on said second end of said plate and performing the function of said reflector.

* * * * *